United States Patent [19]

Gilgallon

[11] 4,040,152

[45] Aug. 9, 1977

[54] SADDLE FOR U-BOLT CLAMP

[76] Inventor: Carl Gilgallon, 24407 Tamarack Circle, Southfield, Mich. 48075

[21] Appl. No.: 757,501

[22] Filed: Jan. 7, 1977

[51] Int. Cl.² .................... B65D 63/00; F16L 33/10
[52] U.S. Cl. ................................................. 24/277
[58] Field of Search ............ 24/277, 275, 276, 135 M

[56] References Cited

U.S. PATENT DOCUMENTS

| 3,729,782 | 5/1973 | Downing | 24/277 |
| 3,955,250 | 5/1976 | Heckethorn | 24/277 |

Primary Examiner—Bernard A. Gelak

Attorney, Agent, or Firm—Barnes, Kisselle, Raisch & Choate

[57] ABSTRACT

A saddle for a U-bolt clamp formed with two similar sheet metal half sections spot welded together in face-to-face relation. The upper central portion of the web of the clamp is formed with a semicircular recess to accommodate one-half of the periphery of the joint between telescoped tubes. At laterally opposite sides thereof the saddle is formed with parallel upright tubular portions adapted to slideably receive the legs of a U-bolt which surrounds the other half of the tube joint. The lower edge of the saddle, and optionally the edge of the semicircular recess, is formed with reinforcement flanges turned outwardly in opposite directions from the plane of the web of the saddle.

8 Claims, 10 Drawing Figures

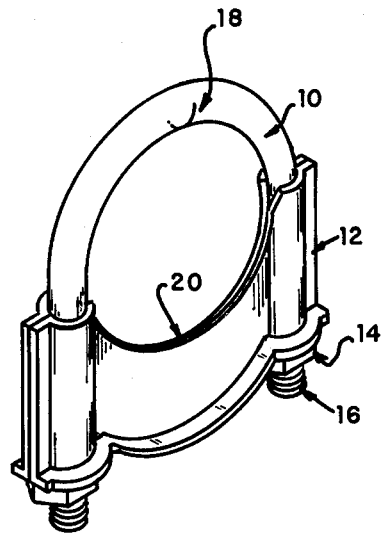
Fig. 1
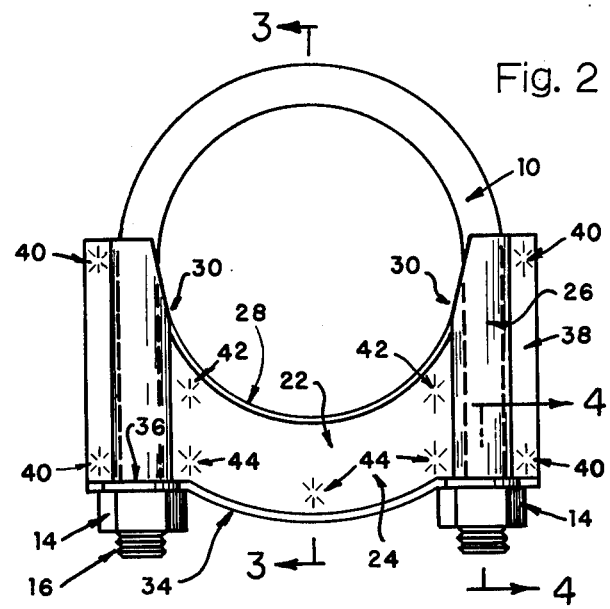
Fig. 2
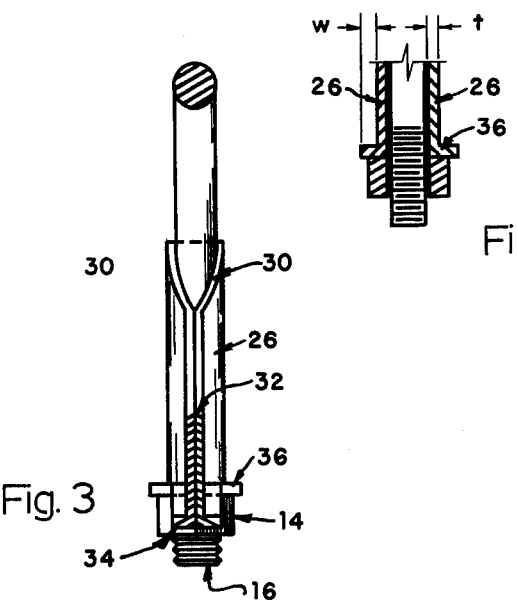
Fig. 3
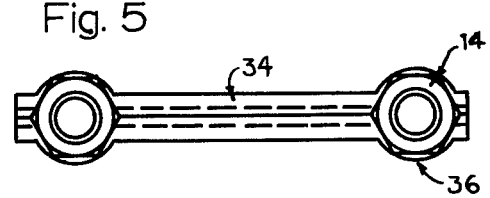
Fig. 4
Fig. 5
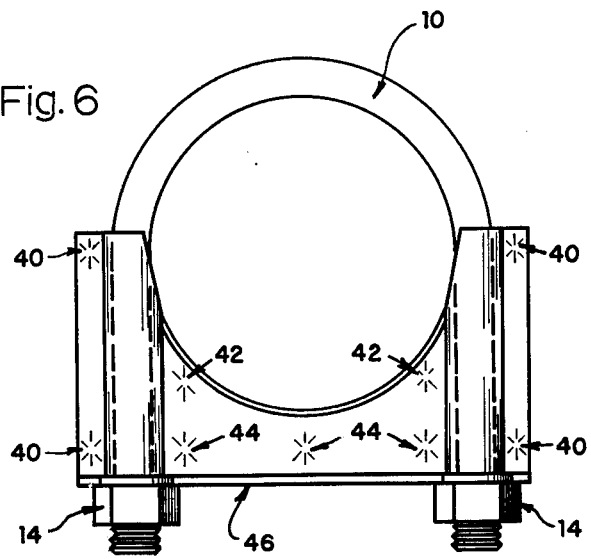
Fig. 6

SADDLE FOR U-BOLT CLAMP

This invention relates to a saddle for U-bolt clamps of the type used for securing together a pair of telescoped metal tubes.

Saddle clamps of the type described are used extensively for securely clamping together tubular sections of exhaust systems of motor vehicles. In the case of large trucks and busses where heavy tube sections are employed in the exhaust system and an extremely fluid-tight joint is required, specifications frequently require the clamp to withstand a torque on the nuts of the U-bolt in the range of 80 foot pounds or more. Unless a stamped sheet metal saddle for such clamps is formed of excessively heavy metal or with substantial reinforcements, the saddle will tend to twist laterally when subjected to such relatively high torque loads.

One solution to this problem of lateral twisting of the clamp saddle is disclosed in U.S. Pat. No. 3,955,250 and resides in forming the sheet metal saddle blank so that the lower edge thereof (the edge opposite the semicircular recess) can be folded back on itself and then bent outwardly so that the lower portion of the saddle web is of four thicknesses of sheet metal with out-turned flanges on both sides spaced intermediate the lower edge of the saddle and the semicircular recess.

While the prior art saddle described above is capable of withstanding torque loading of 80 foot pounds when formed of sheet steel having a thickness of about 0.089 inch, its construction renders it relatively costly to manufacture. This high cost results primarily from the fact that, after the two half sections of the saddle blank are initially stamped and otherwise formed, they must be spot welded together at least along a line adjacent the lower edge of the finished saddle. Since in the finished saddle the portions thereof folded back on itself overlie these spot welds, after the two half sections are spot welded together a separate final press operation is required to form the reinforcements on the saddle.

The primary object of the present invention resides in the provision of a stamped sheet metal saddle of the type described which is capable of withstanding the high torque loads referred to and which can be manufactured more economically than prior art saddle clamps.

More specifically, the clamp saddle of this invention is designed such that each half section can be completely formed in the successive stations of a progressive stamping die and then simply spot welded together in the final operation to provide the finished saddle. In addition, the clamp saddle is capable of withstanding the high torque load specified even though it utilizes less material of the same thickness as the prior art saddles.

Other objects, features and advantages of the present invention will become apparent from the following description and accompanying drawings, in which:

FIG. 1 is a perspective view of a U-bolt clamp embodying one form of saddle according to the present invention;

FIG. 2 is a side elevational view of the clamp;

FIG. 3 is a sectional view along the line 3—3 in FIG. 2;

FIG. 4 is a fragmentary sectional view along the line 4—4 in FIG. 2;

FIG. 5 is a bottom view of the clamp shown in FIG. 2;

FIG. 6 is a side elevational view of a U-bolt clamp employing a slightly modified form of saddle;

Figure 7:
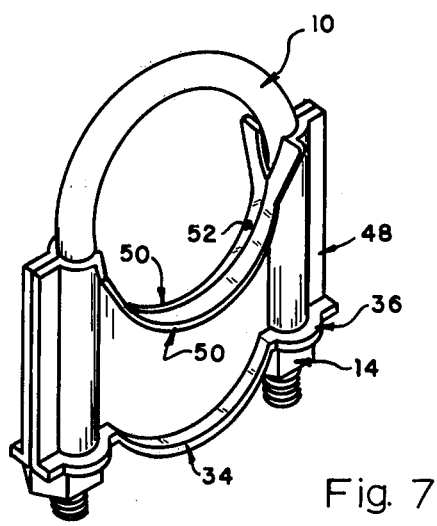
FIG. 7 is a perspective view of another embodiment of clamp according to the present invention.

The U-bolt clamp shown in FIGS. 1 through 5 includes a U-bolt 10 and a saddle 12 which are adapted to be secured around the joint formed between a pair of telescoped metal tubes by means of nuts 14 threaded on the lower ends of the legs 16 of the U-bolt. The bight portion 18 of the U-bolt is of semicircular shape and cooperates with the semicircular edge 20 of saddle 12 to surround the tubular pipe joint throughout 360°.

Saddle 12 is formed of two identical sections 22 formed as metal stampings. Each stamping has a flat central web portion 24 and a pair of parallel semicircular portions 26 which, when the two stampings are welded together, define passageways for slideably receiving the legs 16 of U-bolt 10. The central portion of the upper edge of each stamping 22 is formed with a semicircular recess 28, the opposite upper ends of which intersect the tubular portions 26 as at 30. In the arrangement illustrated in FIGS. 1 through 5 the edges of the two blanks forming recess 28 are sheared at an angle to the plane of the saddle blank so that, when the two half sections 22 are welded together, they define a sharp angled edge 32 admirably suited for tightly gripping and indenting the tubular joint around half of its outer periphery.

Along the lower edge thereof each half section 22 is formed with a laterally outwardly extending arcuate flange 34 generally concentric with the edge of recess 28. At each end thereof flanges 34 are extended as at 36 around the tubular sections 26 and along the lower edges of the laterally outermost flat portions 38 of each saddle section. As a practical matter the minimum width w of flanges 34, 36 should be at least twice the metal thickness t. After the two sections 22 are completely formed they are spot welded together. The spot welds are preferably located on the flat outer flanges 38, as at 40, adjacent the recess 28, as at 42, and along a line closely adjacent the arcuate flange 34, as at 44.

Tests have shown that a saddle constructed in accordance with this invention from a low carbon, high strength sheet metal having a thickness of 0.089 inch is capable of withstanding a torque load of 80 foot pounds or more on the nuts 14 without twisting or distorting. The arcuate flanges 34 provide the necessary reinforcement of the web 24 of the saddle. The extensions 36 of flanges 34 not only impart greater strength to the saddle in a direction generally diagonally thereof, but also provide wide flat bearing surfaces for the nuts 14. When the U-bolt 10 and saddle 12 are tightly clamped around a tubular joint the V-shaped notches formed by the portions 30 of the edges of the recesses 28 insure a tight seal around 360°.

The clamp shown in FIG. 6 differs from that shown in FIGS. 1 through 5 only in that the lower edge of the clamp extends completely across the saddle as a straight line and is defined by a pair of laterally outwardly extending flanges 46. Although the vertical dimension of central portion of the web of the saddle shown in FIG. 6 is somewhat less than that of the saddle of FIGS. 1 through 5, the clamp shown in FIG. 6 is also capable of withstanding a torque load of at least 80 foot pounds on the nuts 14.

Figure 8:
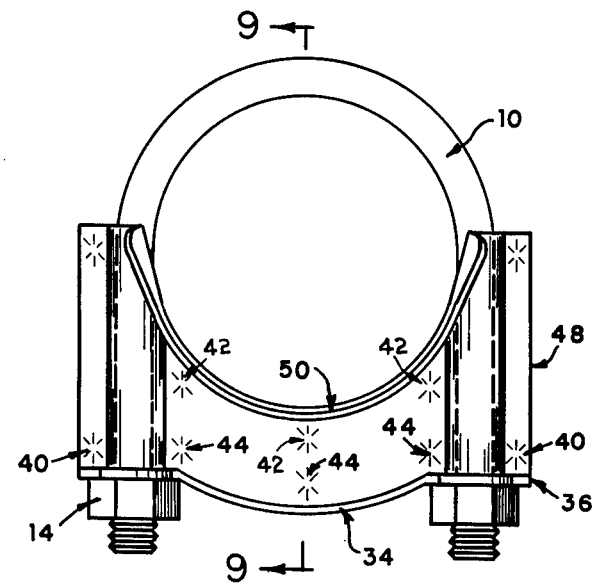
FIG. 8 is a side elevational view of the clamp shown in FIG. 7.
Figures 9, 10:
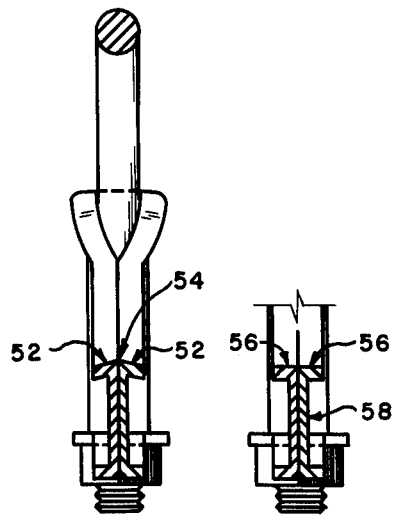
FIG. 9 is a sectional view along the line 9—9 in FIG. 8.
FIG. 10 is a fragmentary sectional view similar to FIG. 9 and showing a further modification.

The clamp shown in FIGS. 7 through 9 differs from that shown in FIGS. 1 through 5 in that the saddle 48 is formed with additional laterally outwardly extending, arcuate flanges 50 around the semicircular recess 52. Flanges 50 are inclined upwardly toward each other as shown in FIG. 9 to define a sharp biting edge 54 for tightly embracing and indenting the outer periphery of the tubular pipe joint. In other respects saddle 48 is the same in construction and configuration as saddle 12.

As shown in FIG. 10, if desired, the arcuate flanges 56 around the semicircular recess 52 can extend laterally outwardly in a plane perpendicular to the plane of web 58 of the clamp. Thus, with the construction shown in FIGS. 7 through 10 the web of the saddle clamp in vertical section is of I-beam shape. On the other hand, the web 24 of the clamp shown in FIGS. 1 through 6 in vertical section is of inverted T shape. The saddles illustrated in FIGS. 7 through 10 are capable of withstanding a higher torque than those shown in FIGS. 1 through 6. However, tests have shown that even the saddles illustrated in FIGS. 1 through 6 are capable of withstanding at least 80 foot pounds of torque on the nuts 14.

I claim:

1. A saddle for a U-bolt clamp comprising two thicknesses of sheet metal secured together in face-to-face relation by spot welding, said saddle having a central flat web provided with upright parallel tubular portions adjacent the laterally opposite ends thereof for slideably receiving the threaded legs of a U-bolt, the upper edge of said web between said tubular portions being of generally semicircular shape to encircle approximately one-half of the circular periphery of a pair of telescopically engaged tube sections, the lower edge of said web being defined by a pair of flanges turned outwardly in opposite directions from the plane of said web and extending throughout the width of said web between said bolt-receiving portions, said sections being spot welded together at least along a line adjacent the lower edge of said web.

2. A saddle as called for in claim 1 wherein said flanges extend continuously throughout the width of said saddle along the lower edge thereof so that the open lower ends of each of said tubular portions is surrounded by a flat bearing flange perpendicular to the axes of said tubular portions.

3. A saddle as called for in claim 1 wherein the portions of said flanges between said tubular portions are generally concentric with the semicircular edge of said web.

4. A saddle as called for in claim 1 wherein said semicircular edge of said web is defined by a pair of flanges turned outwardly in opposite directions from the plane of said web such that in vertical section the web of the saddle is generally of I-beam configuration.

5. A saddle as called for in claim 4 wherein said last-mentioned flanges extend generally perpendicularly to the plane of said web.

6. A saddle as called for in claim 4 wherein said last-mentioned flanges are inclined toward each other in an upwardly direction.

7. A saddle as called for in claim 4 wherein said last-mentioned flanges have a dimension in a direction transverse to the plane of the web equal to at least twice the thickness of each sheet metal section.

8. A saddle as called for in claim 1 wherein each flange projects outwardly from the plane of said web a distance equal to at least twice the thickness of each sheet metal section.

* * * * *

Notice of Adverse Decision in Interference

In Interference No. 99,998, involving Patent No. 4,040,152, C. Gilgallon, SADDLE FOR U-BOLT CLAMP, final judgment adverse to the patentee was rendered Apr. 30, 1980, as to claims 1 and 8.

[*Official Gazette September 30, 1980.*]